3,460,975
TACK-FREE SILICONE RUBBER ARTICLES
FOR MEDICAL USE
Leo F. Stebleton, Midland, Mich., assignor to Dow Corning Corporation, Midland, Mich., a corporation of Michigan
No Drawing. Continuation-in-part of application Ser. No. 441,375, Mar. 19, 1965. This application Nov. 15, 1965, Ser. No. 507,653
Int. Cl. B44d 1/22; C09d 3/36
U.S. Cl. 117—94                            10 Claims

ABSTRACT OF THE DISCLOSURE

A process for providing tack-free silicone rubber articles which are particularly useful for medical applications which involves coating the silicone rubber article with a mixture of a titanate, a silane, and a volatile solvent. The solvent is ultimately dried and the titanate-silane coating is cured. Illustrative of the above is a mixture of methyltrimethoxysilane and tetrabutyltitanate in diethyleneglycoldimethylether. Articles so treated are rendered hydrophobic and renders the possibility of adverse body tissue reaction minimal.

---

This application which is a continuation-in-part of U.S. application Ser. No. 441,375, filed on Mar. 19, 1965, and now abandoned, relates to coated silicone rubber articles which have improved utility in the field of medicine.

Silicone rubber articles are finding growing acceptance in the medical world for a large number of uses, because living tissue does not adhere to silicone rubber, nor does living tissue exhibit any significant adverse reaction upon contact with the same. No other known elastomeric material is tolerated by tissue as well as silicone rubber.

For this reason, silicone catheters, blood conduits, prosthetic implants, etc. are yielding highly superior results in use on human beings.

A further advantage of silicone rubber is that it can be repeatedly "autoclaved" without fear of thermal degradation.

However, sterile, clean, dust-free silicone rubber is quite tacky. Extreme caution must be used in handling clean and sterile silicone rubber, as it is extremely prone to pick up contamination from any source, including the air. Furthermore, clean silicone rubber surfaces will actually bond together if allowed to remain in contact for a matter of weeks or months. The storage of clean, silicone rubber parts therefore is a problem if there is silicone to silicone contact. In the case of thin-walled tubing which tends to collapse, the tubing can bond to itself and thus become useless. Also, the mere operation of siliding a clean silicone rubber object into a package such as a plastic envelope is difficult since the tacky silicone rubber will adhere to the package if both surfaces are dry.

The main object of this invention is to provide a silicone rubber which is free of the disadvantages outlined above while still having a hydrophobic surface that causes no adverse body tissue reaction. The treated rubber of this invention has uses other than in the medical and biological fields; the improved rubber articles of this invention are useful in the electrical and mechanical applications for silicone rubber.

The above object can be attained through this invention, which relates to the process of (1) coating a silicone rubber article suitable for use in contact with living cells, with a composition consisting essentially of from 0.5 to 20 weight percent, based on the weight of the entire composition, of (a) a composition consisting essentially of (1) from 25 to 90 weight percent of RSi(OR')$_3$ and (2) from 10 to 75 weight percent of Ti(OR')$_4$, or a partial hydrolyzate of (1) and (2) above, where R is selected from the group consisting of monovalent hydrocarbon radicals, free of aliphatic unsaturation, of no more than 18 carbon atoms, and the 3,3,3-trifluoropropyl radical and R' is selected from the group consisting of alkyl and alkoxyalkyl radicals of no more than 8 carbon atoms; and from 80 to 99.5 weight percent of (b) a volatile solvent; and (2) drying the solvent and curing the titanate-silane coating, whereby an essentially tack-free silicone rubber article is obtained.

The tack-free silicone rubber articles that are so produced are easily cleanable and sterilizable, since dust and other contamination no longer adheres tightly to the surface. Likewise, they present no abnormal packaging problems of the type encountered with clean, untreated silicone rubber.

Nevertheless, little or no body tissue irritation is noted upon prolonged contact with the coated silicone rubber articles of this invention, and the coating is as thermally stable as the rest of the article.

Likewise, biological materials such as bladder stone or clotted blood do not readily adhere to the coated articles of this invention, as is also the case with untreated silicone rubber. This is believed to be due to the hydrophobic surface of the articles, which gives them a further advantage over their nonsilicone equivalents, for which the adhesion of body products can be a major problem.

It is preferred for the silicone rubber to be primarily composed of dimethylpolysiloxane plus a silica filler, but other nontoxic silicones and fillers are also operative, e.g. silicones such as ethylmethylpolysiloxane, 3,3,3-trifluoropropylmethylpolysiloxane, methylvinylpolysiloxane, phenylmethylpolysiloxane, and copolymers of the above and diphenylsiloxane with dimethylpolysiloxane. Fillers such as TiO$_2$, crushed quartz, and carbon black are usable.

R can be any radical as described above, e.g. alkyl and cycloalkyl radicals such as methyl, isopropyl, n-butyl, cyclohexyl, isohexyl and tetradecyl, and aryl-containing radicals such as phenyl, tolyl, benzyl, 2-phenylpropyl, and xenyl. The methyl and n-propyl radicals are preferred, as are the other n-alkyl radicals. The polynuclear aryl radicals such as anthracenyl are operative, but they are not preferred because their toxicity over the long range is unknown.

R' can be any alkyl or alkoxyalkyl radical of no more than 8 carbon atoms, e.g. methyl, ethyl, isopropyl, sec-butyl, hexyl, 2-ethylhexyl,

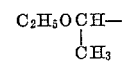

CH$_3$OC$_2$H$_4$—, C$_4$H$_9$OC$_3$H$_6$—, CH$_3$(OCH$_2$CH$_2$)$_2$— and (CH$_3$)$_2$CHOCH$_2$CH$_2$—.

Ingredient (a) can consist of many kinds of titanate and silane, e.g. methyltriethoxysilane, and tetraethyl titanate, tolyltripropoxysilane and tetraisohexyltitanate,

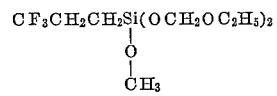

and Ti(OC$_2$H$_5$OC$_2$H$_5$)$_4$, or

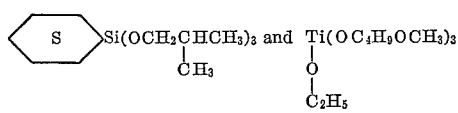

More than one silane or titanate can be used in ingredient (a) if desired; e.g. a mixture of propyltrimethoxysilane, n-decyltrimethoxysilane, and tetraisopropyltitanate is operative.

In each case the —OR' group is hydrolyzable to a silanol or a ≡TiOH group, which, in turn, can react with another silanol group, a ≡SiOR' group, or their titanium equivalents to form a siloxane or other similar linkage, splitting out water or alcohol. Therefore when traces of water are present, ingredient (a) will polymerize to a resinous material, but when water is entirely absent it will not.

When ingredient (a) is placed as a film on a silicone rubber surface, it will react with the moisture of the air and with silanol groups on the silicone rubber to form a thin coating on the rubber. This eliminates the tackiness of the rubber. The exact nature of the coating is unknown, except that it consists essentially of $(RSiO_{3/2})$ units and $(TiO_{4/2})$ units either in a copolymeric or in a mixed homopolymeric form.

Ingredient (a) can also be partial hydrolyzates of the titanate esters and silanes, as long as they are sufficiently unhydrolyzed and uncondensed to remain soluble in a solvent, which is a requirement of the term "partial hydrolyzate," as used herein. The partial hydrolyzates are merely intermediate stages which the titanate esters and silicates shown above must pass through while becoming cured, resinous films on the final product. Therefore partial hydrolyzates of the above esters are considered to be within the scope of the claims of this application.

Any volatile solvent that will dissolve ingredient (a) is suitable for use in this application, but it is preferred to use ethers and other solvents which do not tend to swell silicone rubber to a great extent. Examples of suitable ethers are diethylether, diisopropylether, propyleneglycoldiethylether, dioctylether, di(t-butyl)ether, methyldodecylether, anisole, or tetrahydrofuran. Diethyleneglycoldimethylether is most preferred.

Examples of other suitable volatile solvents are hydrocarbons such as hexane, 2-ethylhexane, decane, dodecane, 2-phenylpropane, benzene, toluene, xylene, or styrene; esters such as hexyl acetate or octyl bromide; alcohols such as methanol, ethanol, isopropanol, or hexanol; and ketones such as acetone, methylethylketone, methylhexylketone, dibutylketone, and phenylmethylketone.

The type of volatile solvent is not critical since it is only a carrier and dispersing agent for ingredient (a), as long as it is essentially nonreactive with ingredient (a). The term "volatile" means that the solvent evaporates at the curing temperature or below.

The curing temperature for the composition of this invention is not critical. The composition will slowly cure at room temperature or below (55° F.). At temperatures of 300° F. or above, the composition will cure in a very few minutes.

The silicone rubber article can be coated with (a) and (b) in any manner, e.g., dipping, spraying, or painting.

It is preferred to use from 25 to 75 weight percent each of the titanate and silane in ingredient (a), the total content of both materials approximating 100 percent.

It is preferred to use from 1 to 15 weight percent of ingredient (a) in from 85 to 99 percent of volatile solvent (ingredient (b)).

The process of this invention can be used to coat any silicone rubber article which is to be used in contact with living cells, particularly human tissues and blood.

Examples of such silicone rubber articles are trachea tubes for patients who have had their larynx removed, thoracic drains, Penrose drains, Foley and other types of catheters, blood conduits for heart-lung machines and artificial kidneys, and chin, nose, and other prosthetic implants.

These articles, once cleaned and promptly treated by the process of this application, are smooth an nontacky. They therefore stay cleaner, are easier to package, store, and handle, and are easier to install under dry conditions than their uncoated silicone rubber counterparts.

The following examples are illustrative only and should not be construed as limiting the invention which is properly delineated in the appended claims.

Example 1

Thin slabs of a dimethylpolysiloxane-based silicone rubber stock which had been cured for 4 hours at 480° F. were treated with the following 10 weight percent solutions of methyltrimethoxysilane and tetrabutyltitanate in diethyleneglycoldimethylether.

The slabs were immersed in the solution for 15 minutes, air-dried for two hours, and cured for 10 minutes at 300° F.

Two slabs which had been treated as above were placed one on top of the other, and a 150 gm. weight was set on top of both. The top slab was then pulled laterally across the bottom slab, and the force required to start the slab moving was measured.

The starting coefficient of friction was calculated, and was compared with the nature of the solids present in the solution that was applied to the rubber slabs.

| Wt. percent CH$^3$Si-(OCH$_3$)$_3$ | Wt. percent Ti(OC$_4$H$_9$)$_4$ | Starting coefficient of friction |
|---|---|---|
| 2.5 | 7.5 | 0.3 |
| 5.0 | 5.0 | 0.2 |
| 7.5 | 2.5 | 0.2 |
| 9.0 | 1.0 | 0.3 to 1.4 |
| No treatment | No treatment | >2.0 |

The rubber to rubber friction of a sample is roughly proportional to its tackiness. All four treated samples showed far less tackiness than the nontreated sample.

Example 2

The experiment of Example 1 was repeated on slabs of dimethylpolysiloxane rubber that had not been post cured and were therefore extra tacky, using solutions in diethyleneglycoldimethylether of equal parts by weight of methyltrimethoxysilane and tetrabutyltitanate. The titanate-silane concentration in the solution was varied with the following results on the coefficients of friction.

| Wt. percent titanate-silane | Starting coefficient of friction | Sliding coefficient of friction |
|---|---|---|
| 1 | 0.51 | 0.34 |
| 2 | 0.41 | 0.34 |
| 4 | 0.41 | 0.31 |
| 6 | 0.41 | 0.31 |
| 10 | 0.41 | 0.27 |
| No treatment | Greatly over 2.0 | |

All five treated samples exhibited little or no tackiness after treatment.

Example 3

A dimethylpolysiloxane rubber trachea tube consisting of an outer tube for inserting into the trachea and a sliding, inner tube fitting inside of the outer tube was treated and cured as in Example 1 with a solution of 5 weight percent of methyltriethoxysilane, 5 weight percent of tetrabutyltitanate, and 90 percent of diethyleneglycoldimethylether.

Before treatment, the cleaned trachea tube was tacky, and the inner tube was barely slidable in the outer tube. After treatment, the trachea tube was no longer tacky, and the inner tube was easily slidable in the outer tube.

The treated tube was used in a patient, being surgically inserted to make an air passage from the trachea to the upper chest. No ill effect or tissue reaction due to the tube was noted over a three week period.

Example 4

A thin-walled Penrose drain, made from dimethylpolysiloxane rubber, was treated by the process of Example 3.

The Penrose drain had tubular walls that were too thin to support the drain in a tubular form; it lay flat in the manner of an uninflated balloon.

The walls of the untreated Penrose drains tended to adhere to each other, often so tightly that the drains were not usable.

The treated drain had no adhesion problems; the drain could be stored in the collapsed position without ill effect.

Example 5

When a silicone rubber blood conduit containing 93 mol percent dimethylsiloxane units and 7 mol percent phenylmethylsiloxane units is dipped in a hexane solution containing a partial hydrolyzate of 0.25 weight percent of phenyltriethoxysilane and 0.25 weight percent of tetraethyltitanate, based on the weight of the total solution, and is allowed to dry for one day in the air at 100° F., the surface of the conduit become significantly less tacky than the untreated silicone rubber surface.

Example 6

When a silicone rubber sheet which consists essentially of 3,3,3-trifluoropropylmethylsiloxane units, made for use in covering new skin grafts, is dipped in a 15 weight percent solution of $CF_3CH_2CH_2Si(OCH_2CH_2OCH_3)_3$ and $Ti(OCH_2CH_2OCH_3)_4$ in equal weights in xylene, and is dried in the air at room temperature for 4 days, the surface of the sheet becomes nontacky and has good lubricity.

Example 7

The experiment of Example 1 was repeated five times, using as a treating solution in each case a mixture of 1.5 parts by weight of one of the silanes listed below, 1.5 parts of tetrabutyltitanate, and 97 parts of diethyleneglycoldimethylether.

The treated slabs of elastomer were tested as in Example 1 with the following results:

| Silane used | Starting coefficient of friction | Sliding coefficient of friction |
|---|---|---|
| (a) Ethyltrimethoxysilane | 0.41 | 0.34 |
| (b) n-Propyltrimethoxysilane | 0.13 | 0.10 |
| (c) n-Butyltrimethoxysilane | 0.47 | 0.34 |
| (d) n-Dodecyltrimethoxysilane | 0.27 | 0.30 |
| (e) n-Octadecyltrimethoxysilane | 0.34 | 0.24 |

That which is claimed is:
1. The process of
  (1) coating a silicone rubber article suitable for use in contact with living cells, with a composition consisting essentially of from 0.5 to 20 weight percent, based on the weight of the entire composition, of
    (a) a composition consisting essentially of
      (1) from 25 to 90 weight percent of
        $RSi(OR')_3$
      and
      (2) from 10 to 75 weight percent of
        $Ti(OR')_4$
      or a partial hydrolyzate of (1) and (2) above, where R is selected from the group consisting of monovalent hydrocarbon radicals, free of aliphatic unsaturation, of no more than 18 carbon atoms, and the 3,3,3-trifluoropropyl radical, and R' is selected from the group consisting of alkyl and alkoxyalkyl radicals of no more than 8 carbon atoms; and from 80 to 99.5 weight percent of
    (b) a volatile solvent for (a); and
  (2) removing the solvent and curing the titanate-silane coating, whereby a tack-free silicone rubber article is obtained.

2. The process of claim 1, practiced on a silicone rubber tube.
3. The process of claim 1 where R is propyl.
4. The process of claim 1 where R is methyl.
5. The process of claim 1 where (a) contains from 25 to 75 weight percent of $Ti(OC_4H_9)_4$.
6. The process of claim 1 where (b) is diethyleneglycoldimethylether.
7. The process of claim 1 where the coating composition consists essentially of 3 weight percent of (a) an equal mixture by weight of n-propyltrimethoxysilane and tetrabutyltitanate, and 97 weight percent of (b) diethyleneglycoldimethylether.
8. The process of claim 1 where the silicone rubber is essentially dimethylpolysiloxane.
9. The process of claim 1 where (a) is unhydrolyzed.
10. The process of claim 1 where (a) is a partial hydrolyzate.

References Cited

UNITED STATES PATENTS

| 2,470,772 | 5/1949 | Haas | 117—139 |
| 2,672,455 | 3/1954 | Currie | 260—46.5 X |
| 2,716,656 | 8/1955 | Boyd | 117—161 X |
| 3,113,883 | 12/1963 | James | 117—138.8 X |
| 3,328,482 | 6/1967 | Northrup et al. | 117—138.8 X |

OTHER REFERENCES

Andrianov et al., Synthesis of New Polymers With Inorganic Chains of Molecules, J.P.S., vol. XXX, pp. 513 to 524 (1958).

WILLIAM D. MARTIN, Primary Examiner

J. E. MILLER, Assistant Examiner

U.S. Cl. X.R.

117—138, 139, 161; 260—2, 46